United States Patent
Honeck et al.

(10) Patent No.: US 7,084,749 B1
(45) Date of Patent: Aug. 1, 2006

(54) REMOTE DISPLAY SYSTEM WITH INDEPENDENT POWER SOURCE

(75) Inventors: Brian S. Honeck, Holland, MI (US); James P. Robillard, Zeeland, MI (US)

(73) Assignee: Prince Technology Corporation, Holland, MI (US)

( * ) Notice: Subject to any disclaimer, the term of this patent is extended or adjusted under 35 U.S.C. 154(b) by 0 days.

(21) Appl. No.: 09/361,449

(22) Filed: Jul. 26, 1999

(51) Int. Cl.
*B60C 23/00* (2006.01)

(52) U.S. Cl. ............ 340/445; 340/442; 340/447; 340/539.1; 73/146.5

(58) Field of Classification Search ............ 340/445, 340/442, 447, 539.1, 825.31, 825.64, 825.72, 340/443, 444, 448, 10.1; 73/146.5, 146.2, 73/146.3; 455/89; 200/61.22
See application file for complete search history.

(56) References Cited

U.S. PATENT DOCUMENTS

| | | | |
|---|---|---|---|
| 4,334,215 A * | 6/1982 | Frazier | 340/539 |
| 4,529,961 A | 7/1985 | Nishimura et al. | |
| 5,058,203 A * | 10/1991 | Inagami | 379/61 |
| 5,297,424 A | 3/1994 | Sackett | |
| 5,432,526 A * | 7/1995 | Hyatt | 345/87 |
| 5,473,938 A * | 12/1995 | Handfield | 340/445 |
| 5,483,826 A * | 1/1996 | Schultz et al. | 340/445 |
| 5,587,698 A | 12/1996 | Genna | |
| 5,602,524 A | 2/1997 | Mock et al. | |
| 5,691,694 A | 11/1997 | Horie | |
| 5,741,966 A | 4/1998 | Handfield et al. | |
| 5,748,076 A | 5/1998 | Horie | |
| 5,825,286 A * | 10/1998 | Coulthard | 340/445 |
| 5,838,229 A | 11/1998 | Robinson, III | |
| 5,920,268 A * | 7/1999 | Bucci et al. | 340/825.31 |
| 6,025,777 A * | 2/2000 | Fuller | 340/442 |
| 6,034,596 A * | 3/2000 | Smith | 340/447 |
| 6,087,930 A * | 7/2000 | Kulka | 340/447 |

OTHER PUBLICATIONS

TRW Automotive Electronics: TRW TireWatch™ System Brochure.

* cited by examiner

*Primary Examiner*—Anh V. La
(74) *Attorney, Agent, or Firm*—Foley & Lardner LLP

(57) ABSTRACT

A display apparatus for indicating tire pressure or other information about a vehicle. The display apparatus includes an independent power source, having no connection to the electrical power system of the vehicle, for powering the display apparatus, and a receiver for receiving electromagnetic radiation containing the information from at least one transmitter coupled the vehicle, the information being indicated on a display of the display apparatus.

40 Claims, 4 Drawing Sheets

REMOTE DISPLAY SYSTEM WITH INDEPENDENT POWER SOURCE

BACKGROUND OF THE INVENTION

The present invention relates to an electronic display apparatus for automotive vehicles. More specifically, the present invention relates to a display powered independently from the vehicle power supply and which indicates information from a remote transmitter located within the vehicle.

Tire inflation pressure is an important parameter for automobiles, trucks and other vehicles. Proper tire inflation pressure is necessary to insure sufficient traction, particularly during emergency braking and maneuvering conditions, and to prevent excess wear on tires which may lead to further handling problems.

Often, motor vehicle operators do not take the time to monitor the pressure in a vehicle's tires. Once the tires are inflated, pressure is not generally measured unless a tire is visibly under-inflated or tire inflation has caused a degradation in vehicle handling which is apparent to the operator. By this point, the tire has already been operated in a state of improper inflation and may have suffered irregular wear. It is desirable that a tire's air pressure is within the range specified for the particular vehicle and tire model. It is also desirable to provide tire pressure status to an operator to enable correction of any tire pressure problems.

Tire manufacturers and motor vehicle manufacturers are increasingly offering so called "run-flat" tires for use by motorists. These tires enable the vehicle to be operated even when a complete loss of tire pressure has occurred, for example, upon encountering a road hazard which punctures the tire. These tires include internal structures which support the vehicle even in the complete absence of tire inflation pressure. In fact, these tires perform so well in a deflated position that vehicle operators may not be immediately aware that a pressure loss has occurred. Although such tires perform satisfactorily in the absence of tire pressure, it is necessary for the operator to observe driving limitations with these tires when tire inflation pressure is lost. For example, servicing of the tire should be completed before significant mileage is placed on the tire. Moreover, vehicle speed limitations must be observed in such conditions. Accordingly, that is a need to provide a tire inflation pressure monitoring system for operators of vehicles having nm-flat tires installed.

Owners of existing vehicles who desire to add electronic devices to the vehicle are faced with the difficulty of connecting the device to the vehicle's electrical supply system. In many cases, this is a difficult and complex task and may necessitate the running of electrical conductors in parts of the vehicle where convenient access is not provided to the vehicle's wiring harness. Furthermore, such wiring may exceed the skill of some vehicle operators who desire to enhance the capabilities of their vehicles through the use of after market electrical accessories. Therefore, there is a need to provide an electronic tire pressure warning display especially for after market applications which does not require connection with the vehicle's existing wiring harness.

SUMMARY OF THE INVENTION

In accordance with the present invention, the display apparatus includes a housing, a display, an independent power source such as a battery, a microprocessor, a motion sensor, and a receiver for receiving signal transmissions from remote transmitters such as pressure transducers located within or proximate to the tires of a vehicle. In the preferred embodiment, the display will indicate the tire pressure of each tire to the operator of the vehicle and generate audible and/or graphic alarms when any tire has dropped below a critical tire pressure or other predetermined pressure level.

The display apparatus relies on internal power rather than the vehicle's electrical system for power, eliminating the need to create physical electrical connections from the display apparatus to the vehicle electrical system. Thus, the need for any type of electrical plugs/interfaces and wiring harnesses is eliminated, and the display apparatus may be easily fitted to a vehicle as a mid market or an after market assembly. The independent power source may be a battery, a solar cell, or other similar independent power source. In the preferred embodiment, the display apparatus is mounted on a rearview mirror, visor, or other interior component in a vehicle.

When using a battery as an electrical power source, the display apparatus is programmed to extend the life of the battery power source. A receiver located in the display apparatus will alternate between a high power mode and a low power quiescent mode, depending on the presence of an operator in the vehicle, the movement of the vehicle, or the reception of information from a remote transmitter. A motion sensor which can be initiated by a car door slamming, engine vibration, or vehicle movement will "wake up" or initiate the high power mode. The microprocessor in the display may also be switched between a high clock speed and a power conserving low clock speed depending upon the operations which need to be performed.

BRIEF DESCRIPTION OF THE DRAWINGS

The various advantages of the present invention will become apparent to those skilled in the art after reading the following specification and by reference to the drawings, in which.

DETAILED DESCRIPTION OF THE PREFERRED EMBODIMENT

The following description of the present embodiment is merely exemplary in nature and is in no way intended to limit the invention, its application, or its uses. Moreover, while the preferred embodiment depicts a display designed to operate with a rearview mirror, the following description is intended to adequately teach one skilled in the art to make and use a display for visors or other components located in a vehicle interior. Furthermore, the following description, while depicting a display designed to indicate tire pressure information transmitted by a pressure transducer, is intended to adequately teach one skilled in the art to display any type of information from any type of transmitter.

Figure 1:
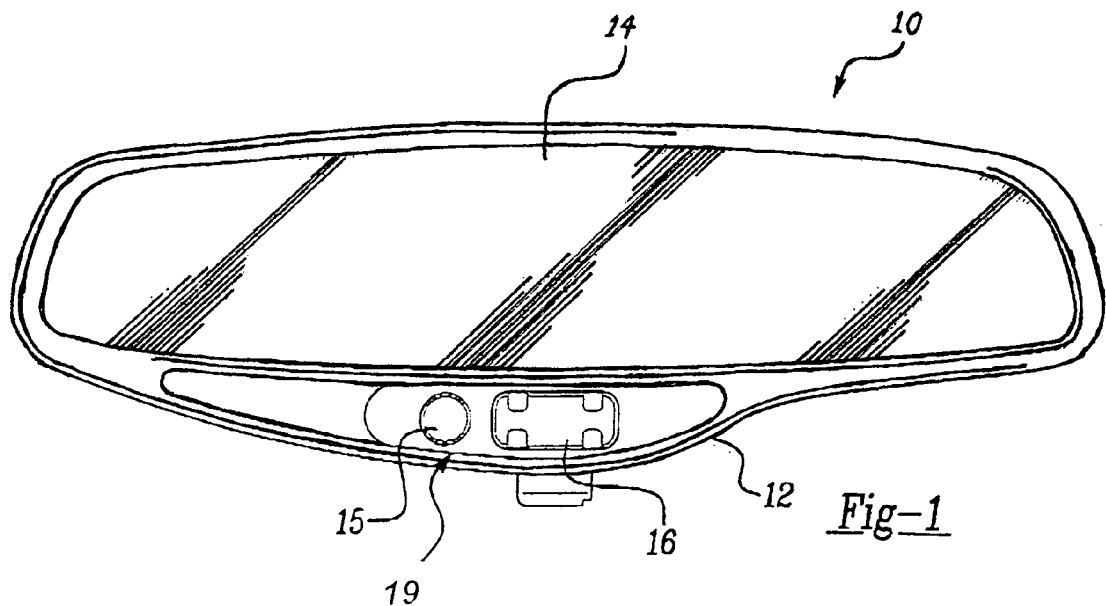
FIGS. 1 and 2 are diagrammatic drawings of a rearview mirror incorporating the display apparatus of the present invention.
Figure 2:
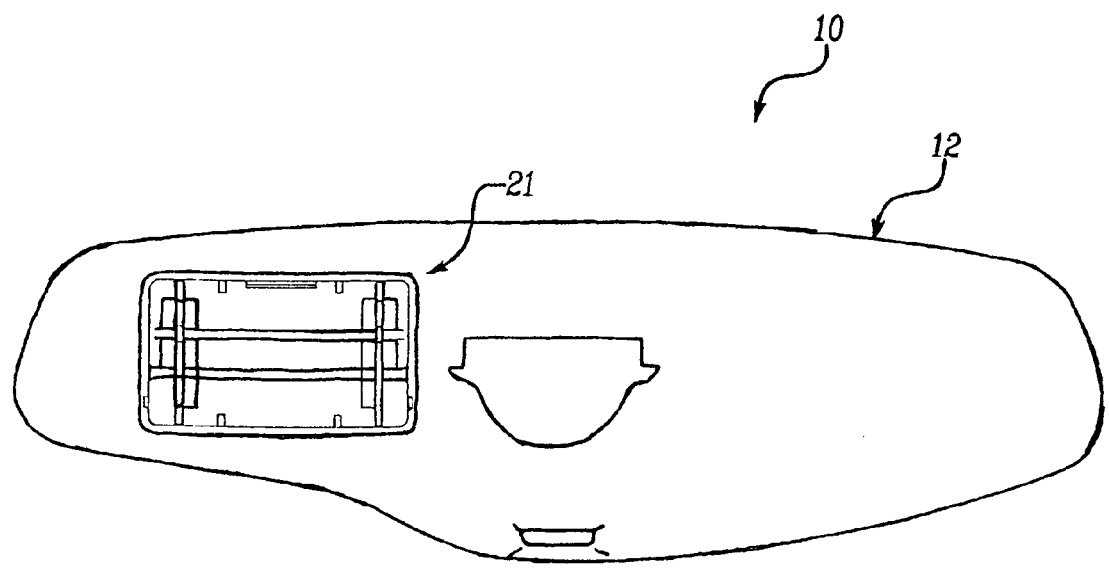

Referring to FIGS. 1 and 2, a display apparatus 10 is shown as having a housing 12 incorporating a rearview mirror 14 and a display 16. The display 16 indicates tire pressure information or other information transmitted using the electromagnetic radiation via radio waves from pressure transducers/transmitters (not shown) measuring the tire pressure of a vehicle's tires. Electromagnetic radiation is defined as any electromagnetic frequency between 10 kHz and 100 gHz. The display 16 communicates numeric data corresponding to tire pressure and visual alarms such as "high" and "low" pressure. In addition to these alarms, an audible alarm generator such as a beeper, chime or horn 40 (shown in FIG. 3c) may be incorporated into the housing 12. The display 16 preferably utilizes a liquid crystal display ("LCD") although a light emitting diode (LED) display, vacuum fluorescent display, an array of individual LED's, or other similar display may also be used to provide a visual display to an operator. If an LCD is used, a light generating background may be incorporated into the LCD so that it may be viewed in low light conditions. The display 16 is also programmable to execute many additional functions. A button 15 located in the "chin" area 19 of the rearview mirror is the operator interface for programming and setting the display 16. The button 15 and its operation will be discussed below in conjunction with the operation of the display 16.

The display 16 and other electrical power consuming elements in the display apparatus 10 are provided power by an independent power source 20 (shown in FIG. 3c), such as a battery. This independent power source 20 eliminates the need for a physical electrical connection to the vehicle's electrical power system. Thus, the display apparatus containing the display 16 may be easily fitted to a vehicle as an after market feature, since any wiring issues have been eliminated by the use of an independent power source. As shown in FIG. 2, a battery compartment 21 is located on the back of the display apparatus 10 and preferably is configured to accept AAA size batteries, although any other battery size is within the scope of this invention. The batteries may be configured in series or parallel depending upon the specific power requirements of the receiver/display 16.

Figure 3A:
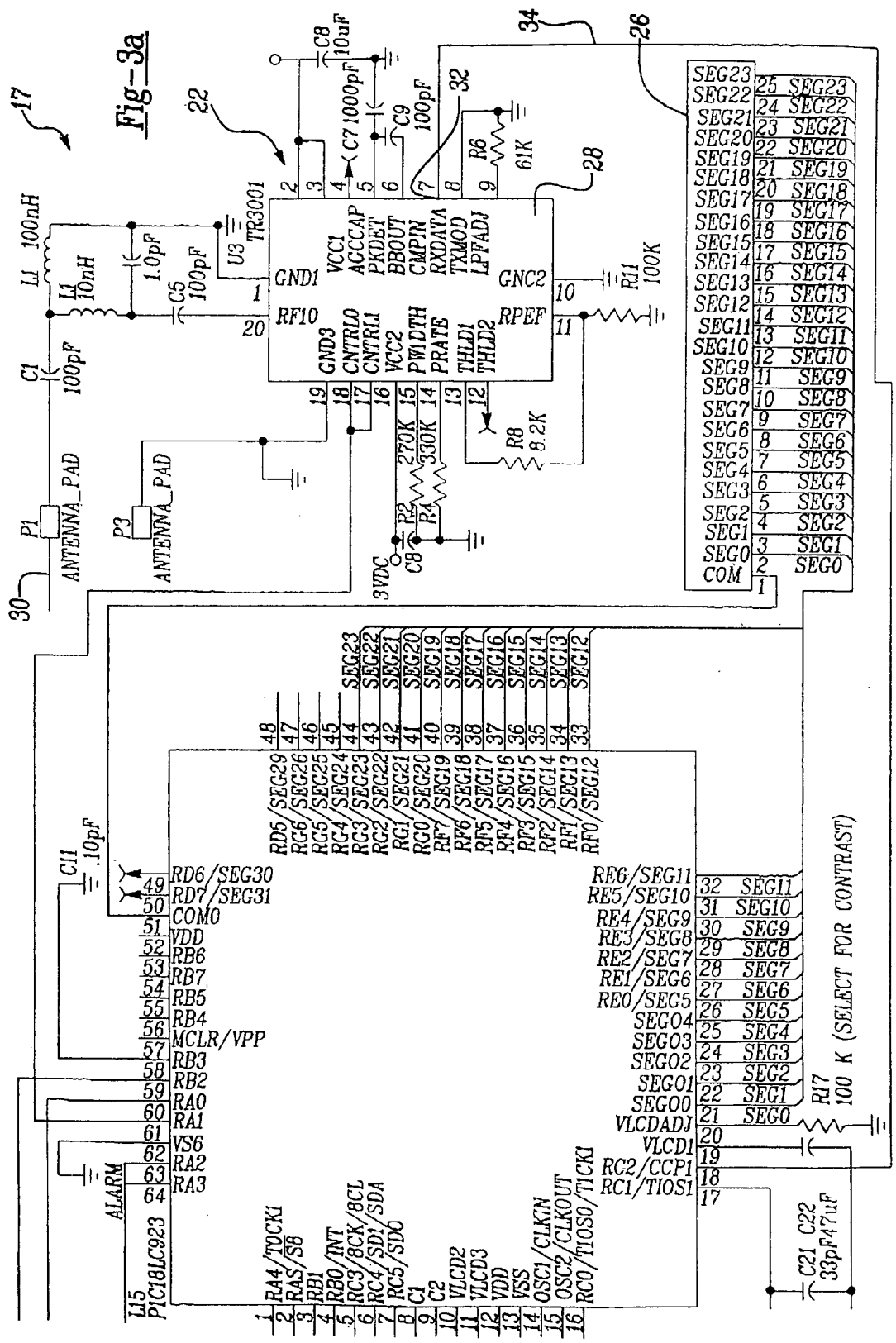
FIGS. 3a, 3b, and 3c illustrate a diagram of an electrical circuit used in the present invention.
Figure 3B:
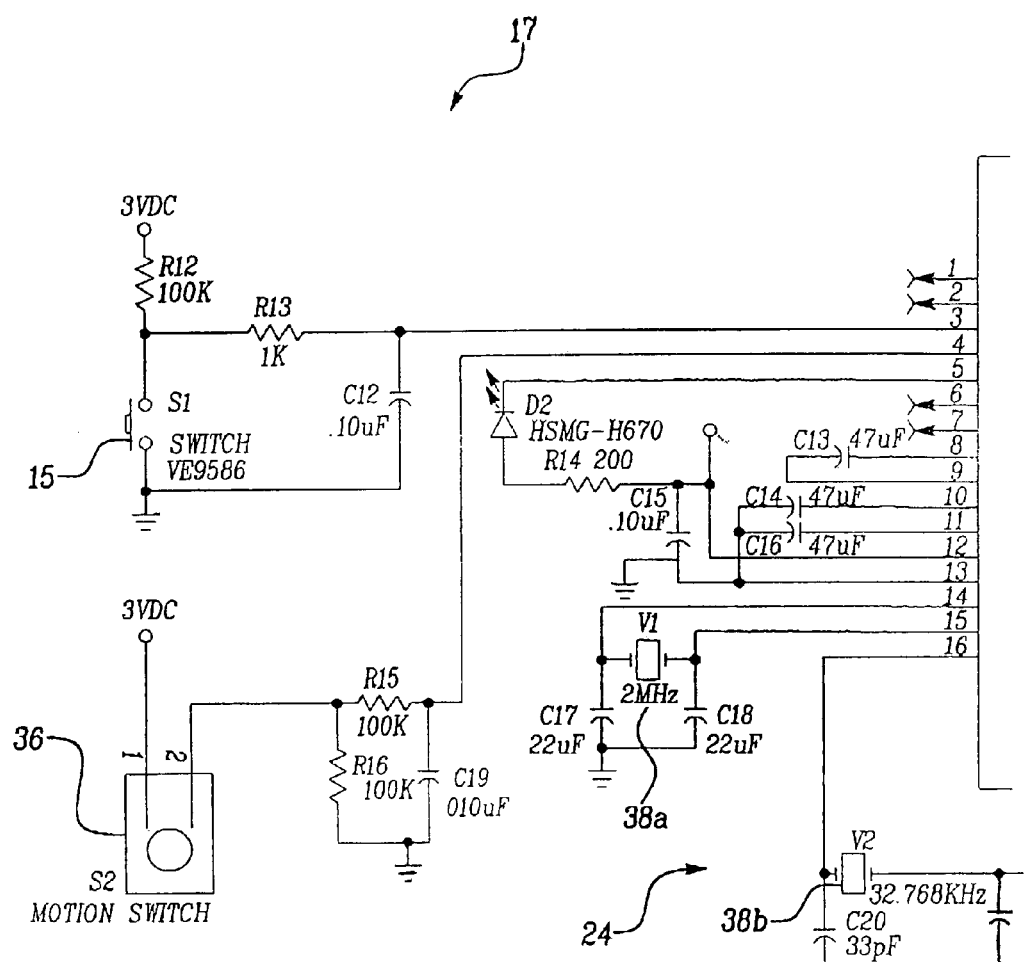
Figure 3C:
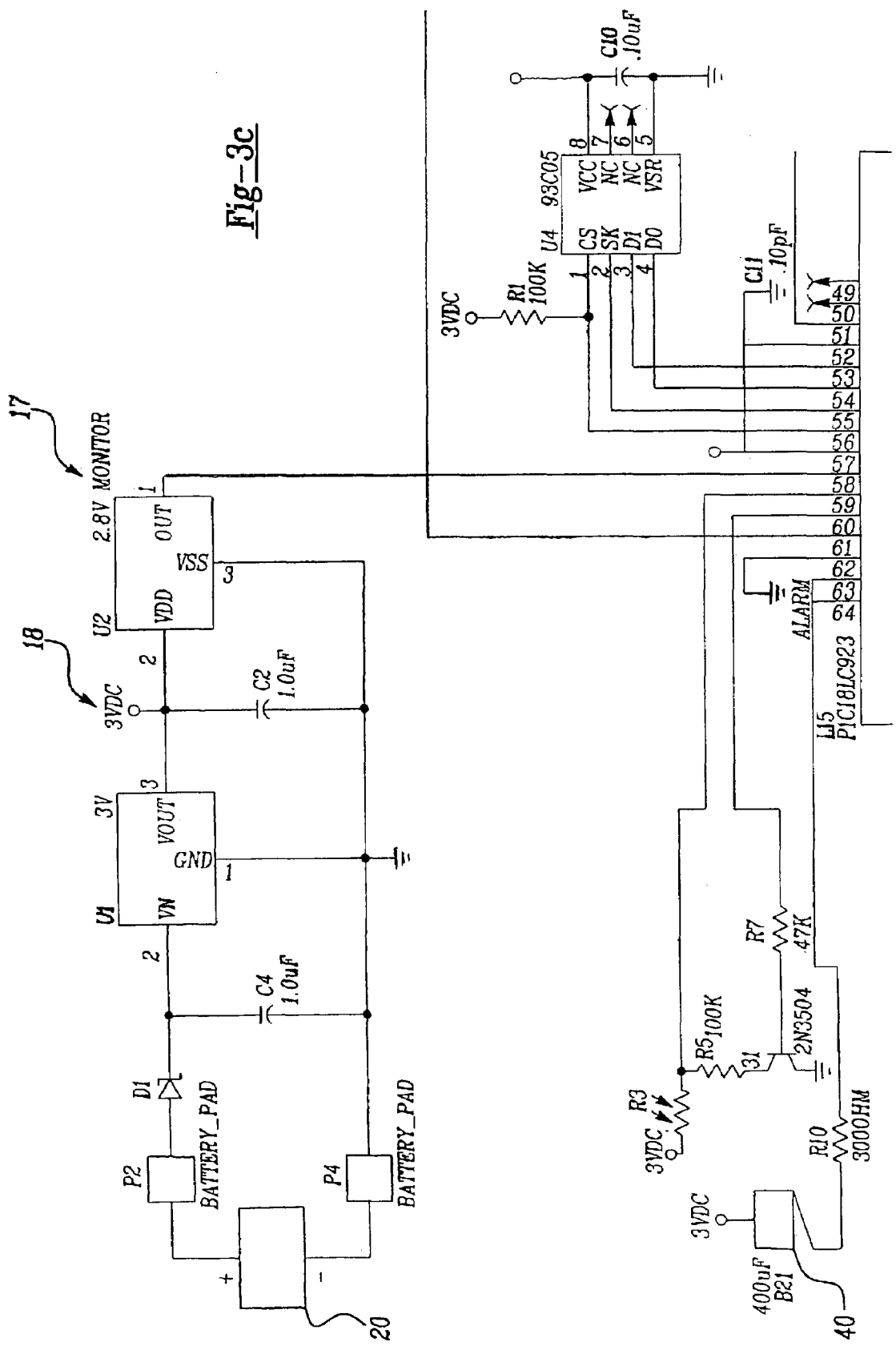

FIGS. 3a and 3c, in combination, illustrate a diagram of the circuitry 17 used in the display 16 of the present invention and include: power conditioning circuitry 18, including an independent or battery power source 20; receiver or transceiver circuitry 22; a microprocessor 24 having multiple input/output connections; and an LCD display 26. The power conditioning circuitry 18 in the preferred embodiment is configured to generate three volts of electrical potential.

The receiver or transceiver circuitry 22 includes an integrated circuit 28 coupled to an antenna 30, preferably for the reception and interpretation of tire pressure information from pressure transducers/transmitter via radio waves. As stated previously, this invention is not limited to tire pressure information, tire temperature, road temperature, humidity or similar parameters may be transmitted to the display via radio waves. The transmission frequency is preferably 315 MHz but may be any other frequency in which information can be transmitted information is encoded onto the transmission through amplitude modulation, on-off keying, frequency shift keying, or any other type of radio frequency modulation which may be used to encode information. The integrated circuit 28 further transfers tire pressure or other information via a data output port a data link 34 to the microprocessor 24.

The microprocessor 24 is programmable and includes nonvolatile memory for the storage of programs and other data. The microprocessor further includes numerous inputs and outputs, including inputs for the operator interface button 15, a motion sensor 36, oscillators 38a and 38b, and outputs for the alarm horn 40 and the LCD display 26.

The operation of the circuitry 17 has been optimized to reduce power consumption. Data has shown that a vehicle is typically used 300–400 hours per year (3.4%–4.6% of the time). Thus, the power consumption of the circuitry 17 during the period of time that the vehicle is not operated is reduced by various programs and configurations in the present invention to extend the life of the battery power source 20. The circuitry 17 will enter a sleep or quiescent low power consumption mode when data transmissions have not been received for greater than 5 minutes and "wake-up" during certain preprogrammed events or occurrences. During this mode the microprocessor 24 will cycle between a higher clock speed and a lower clock speed, generated by oscillators 38a (2 MHz) and 38b (32.768 kHz), to check for RF data transmissions from the pressure transducers/transmitters. The preferred RF sampling duty cycle 1 millisecond of every 25 milliseconds, although any similar duty cycle is within the scope of this invention. The microprocessor, when looking for RF data, will preferably operate at 2 MHz when processing rF data and at 32 MHz during sleep mode.

If data is being transmitted from the transducers/transmitters to the display 16, the microprocessor 24 will "wake up", maintain the higher clock speed, and conduct normal operation. If no data is being transmitted, the microprocessor 24 will continue to operate through the duty cycle. The circuitry 17 may also be woken up by a motion sensor 36. The motion sensor 36 will switch or activate in response to motion such as a door closing, a trunk closing, or vehicle travel. The motion sensor may be a mercury switch, a piezoelectric element, or other similar motion switching device. Upon being woken up by any of the identified events, the display 16 will turn on and show the latest tire pressure information available.

The display 16 may be programmed by an operator using the operator interface. During the initial start-up of the display 16, the display 16 will not show any information until the display 16 has learned the tire identifications. Each tire will have a specific identification associated with its position on the vehicle such as left front (LF), left rear (LF), right front (RF), and right rear (RR). The tire identifications may comprise a specific bit sequence encoded for each pressure transducer/transmitter framed with that transducer's transmitted tire pressure information, but is not limited to such. By pushing the operator interface button 15 for a specified time the display 16 will enter a training mode where it will cycle through information transmitted for each tire and learn their position and identification codes. The display 16 will then be able to properly correlate tire pressure information with tire position and display this information for the operator.

The operator interface button 15 further enables the operator of the vehicle to cycle the display 16 through the information transmitted for each tire so that the tire pressure and condition may be viewed. The display will default in the preferred mode to a single tire such as the LF tire. In alternate embodiments of the present invention, all four tire pressures and conditions may be displayed simultaneously but will necessitate a larger display.

The display 16 will warn an operator of a vehicle of low tire pressure conditions through various audible and visual alarms. When the display 16 receives a pressure measurement that has been programmed to correlate to a specific condition, the display 16 will both audibly and visually draw the attention of the operator. The horn 40 will generate audible warnings and the display 16 will flash or be backlighted. If multiple tires are in a state of alarm the worst case condition will be indicated. The display will further indicate to the operator a failed transmitter or low power condition.

It is to be understood that the invention is not limited to the exact construction illustrated and described above, but that various changes and modifications may be made without departing from the spirit and scope of the inventions as defined in the following claims.

We claim:

1. A display apparatus for a vehicle comprising;
a receiver for receiving electromagnetic radiation sent from one or more remote transmitters coupled to the vehicle, said electromagnetic radiation providing information to said receiver;
a display;
an independent power source for providing power to said receiver and said display, wherein the display apparatus is operable independent of any connection to the power system of the vehicle;
a motion sensor configured to detect a motion; and
a control circuit configured to adjust power consumption of the display apparatus in response to the detected motion.

2. The display apparatus of claim 1, wherein said information includes tire pressure values from one or more tires on the vehicle.

3. The display apparatus for claim 1 wherein said information includes an identification value thereby indicating which of the one or more remote transmitters is sending said information.

4. The display apparatus of claim 1, wherein said display apparatus is mounted to a rearview mirror assembly for a vehicle.

5. The display apparatus of claim 1, wherein said electromagnetic radiation has a frequency substantially between 200 Megahertz and 600 Megahertz.

6. The display apparatus of claim 1, wherein said information is received by said receiver as amplitude modulation of said electromagnetic radiation.

7. The display apparatus of claim 1, wherein said information is received by said receiver as frequency shift keying of said electromagnetic radiation.

8. The display apparatus of claim 1 wherein said display includes a liquid crystal display.

9. The display apparatus of claim 1, further comprising a microprocessor for executing one or more programs stored in a non-volatile memory.

10. The display apparatus of claim 9, wherein said one or more programs selectively switch said microprocessor from a high-clock speed to a low clock speed thereby increasing the life cycle of said independent power source.

11. The display apparatus of claim 9, wherein said one or more programs selectively activate a duty cycle in which said receiver is alternately turned off for a first period of time and turned on for a second period of time in the absence of electromagnetic radiation from the one or more remote transmitters.

12. The display apparatus of claim 9, wherein said motion sensor selectively switches said microprocessor between a low clock speed and a high clock speed.

13. The display apparatus of claim 1, wherein the motion sensor selectively switches the display between a powered on position and a powered off position.

14. The display apparatus of claim 1, wherein the motion sensor will activate in response to an operator's motion.

15. The display apparatus of claim 1, wherein the motion sensor will activate in response to a vehicle motion.

16. The display apparatus of claim 15, wherein the vehicle motion is a door closing or a trunk closing.

17. The display apparatus of claim 15, wherein the vehicle motion is vehicle travel.

18. A display apparatus for a vehicle comprising:
a receiver for receiving electromagnetic radiation sent from one or more remote transmitters coupled to the vehicle, the electromagnetic radiation providing information to the receiver;
a display;
a control circuit;
a battery for providing power to at least one of the receiver, control circuit and display such that at least one of the receiver, control circuit and display is operable independent of any connection to the power system of the vehicle; and
wherein the control circuit is configured to adjust power consumption of the display in response to receiving the electromagnetic radiation.

19. The display apparatus of claim 18 wherein said information includes tire pressure values from one or more tires on the vehicle.

20. The display apparatus of claim 18 wherein the control circuit is configured to activate a duty cycle in which said receiver is alternately turned off for a first period of time and turned on for a second period of time in the absence of electromagnetic radiation from the one or more remote transmitters.

21. The display apparatus of claim 20 wherein said first period of time is greater than said second period of time.

22. The display apparatus of claim 18, wherein the control circuit adjusts power consumption of at least one of the receiver, control circuit and display by selectively switching the control circuit between a first clock speed and a second clock speed.

23. The display apparatus of claim 18, wherein the control circuit adjusts power consumption of at least one of the receiver, control circuit and display by selectively switching the display between a powered on position and a powered off position.

24. An apparatus for a vehicle having a power system therein, said apparatus comprising:
a receiver for receiving electromagnetic radiation sent from one or more remote transmitters coupled to the vehicle, said electromagnetic radiation providing tire pressure information about one or more tires on the vehicle;
a control circuit configured to receive tire pressure information and to generate display signals;
a display visible to an occupant of the vehicle and configured to receive the display signals for providing the occupant with a visible indication corresponding to said tire pressure information;
a battery for providing power to at least one of said receiver, said control circuit, and said display such that at least one of said receiver, control circuit, and display is operable independent of any connection to the power system of the vehicle;
a motion sensor configured to detect a motion, wherein the control circuit is configured to adjust power consumption of the at least one receiver, control circuit, and display in response to the detected motion.

25. The apparatus of claim 24, wherein the motion sensor selectively switches the control circuit between a first clock speed and a second clock speed.

26. The apparatus of claim 24 wherein said electromagnetic radiation has a frequency substantially between 300 Megahertz and 330 Megahertz.

27. The apparatus of claim 24, further comprising a housing securable to the vehicle, wherein the display is couples to the housing.

28. The apparatus of claim 24, further comprising a mirror coupled to the housing.

29. The apparatus of claim 24, wherein the motion sensor selectively switches the display between a powered on position and a powered off position.

30. The apparatus of claim 24, wherein the motion sensor will activate in response to an operator's motion.

31. The apparatus of claim 24, wherein the motion sensor will activate in response to a vehicle motion.

32. The apparatus of claim 31, wherein the vehicle motion is a door closing or a trunk closing.

33. The apparatus of claim 31, wherein the vehicle motion is vehicle travel.

34. A method of displaying information about a vehicle having a display apparatus, the display apparatus comprising a display, a control circuit, and a receiver, the method comprising:

powering the display apparatus with an independent power source such that the display apparatus is operable independent of any connection to the power system of the vehicle;

receiving the information from a remote transmitter coupled to the vehicle via electromagnetic radiation;

adjusting the power consumption of the display in response to receiving the information from the remote transmitter; and providing a visual display of the information on the display.

35. The method of claim 34 wherein said independent power source is a battery.

36. The method of claim 34 wherein said information is tire pressure information.

37. The method of claim 34, wherein adjusting the power consumption of the display apparatus further comprises selectively switching the display apparatus between a first clock speed and a second clock speed.

38. The method of claim 34, wherein adjusting the power consumption of the display apparatus further comprises selectively switching the display apparatus between a powered on position and a powered off position.

39. The method of claim 34, wherein adjusting the power consumption of the display apparatus further comprises powering down the display apparatus during daytime.

40. The method of claim 39, wherein powering down the display apparatus further comprises using a photocell to control operation of the display.

* * * * *